(12) United States Patent
Yoshimoto et al.

(10) Patent No.: US 9,444,281 B2
(45) Date of Patent: Sep. 13, 2016

(54) UNIFIED HIGH POWER AND LOW POWER BATTERY CHARGER

(71) Applicant: Apple Inc., Cupertino, CA (US)

(72) Inventors: Mark A. Yoshimoto, San Jose, CA (US); Talbott M. Houk, Cupertino, CA (US); Jamie L. Langlinais, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 14/538,729

(22) Filed: Nov. 11, 2014

(65) Prior Publication Data

US 2015/0194821 A1 Jul. 9, 2015

Related U.S. Application Data

(60) Provisional application No. 61/923,532, filed on Jan. 3, 2014.

(51) Int. Cl.
*H02J 7/00* (2006.01)
*H02J 7/02* (2016.01)

(52) U.S. Cl.
CPC .............. *H02J 7/007* (2013.01); *H02J 7/0052* (2013.01); *H02J 7/0022* (2013.01); *Y02B 40/90* (2013.01); *Y02B 70/1491* (2013.01); *Y02B 70/16* (2013.01)

(58) Field of Classification Search
CPC ...... H02J 7/007; H02J 7/0052; H02J 7/0022; Y02B 70/16; Y02B 40/90; Y02B 70/1491
See application file for complete search history.

(56) References Cited

U.S. PATENT DOCUMENTS

| | | | | |
|---|---|---|---|---|
| 3,748,492 | A * | 7/1973 | Baker | G05F 1/62 307/117 |
| 5,801,572 | A | 9/1998 | Nakamura | |
| 6,804,098 | B2 * | 10/2004 | Pannwitz | H02J 7/0031 307/10.7 |
| 7,956,578 | B2 * | 6/2011 | Odaohara | G06F 1/30 320/116 |
| 8,330,436 | B2 * | 12/2012 | Oraw | H02J 1/102 323/268 |
| 8,450,976 | B2 * | 5/2013 | Lipcsei | H02J 7/0083 320/134 |
| 8,569,996 | B2 * | 10/2013 | Ha | H02J 7/0068 320/124 |
| 8,587,150 | B2 * | 11/2013 | Parakulam | H02J 1/102 307/72 |

(Continued)

FOREIGN PATENT DOCUMENTS

EP 1608066 12/2005

OTHER PUBLICATIONS

European Application No. 14199841.9—European Search Report dated May 11, 2015.

*Primary Examiner* — Naum B Levin
(74) *Attorney, Agent, or Firm* — Downey Brand LLP

(57) ABSTRACT

The embodiments discussed herein relate to systems, methods, and apparatus for providing a charger capable of adaptively handling a range of power inputs. The charger can selectively activate different control switches within the charger in order to more efficiently use current supplied to the charger. When a low power input is provided to the charger, the charger can reduce the number of active control switches being used to provide a voltage output from the charger. In this way, the capacitance required to toggle the control switches can be reduced. When a high power input is provided to the charger, the number of active control switches can be increased in order to increase a total amount of charge that can be provided from the charger, thereby reducing charge times for batteries.

20 Claims, 8 Drawing Sheets

(56) References Cited

U.S. PATENT DOCUMENTS

| | | | | |
|---|---|---|---|---|
| 8,929,169 B1* | 1/2015 | Yang | ................. | G11C 5/063 |
| | | | | 365/226 |
| 9,142,982 B2* | 9/2015 | Chen | ................. | H02J 7/0021 |
| 9,312,760 B2* | 4/2016 | Sandner | ............ | H02M 3/156 |
| 2008/0197904 A1* | 8/2008 | Bolz | ............. | H03K 17/6871 |
| | | | | 327/180 |
| 2010/0231179 A1* | 9/2010 | Ha | ................... | H02J 7/0068 |
| | | | | 320/164 |
| 2013/0119922 A1* | 5/2013 | Chen | ................. | H02J 7/0021 |
| | | | | 320/107 |
| 2013/0176011 A1 | 7/2013 | Muhammad | | |
| 2013/0234668 A1* | 9/2013 | Kuo | .................. | G06F 1/266 |
| | | | | 320/125 |
| 2013/0313903 A1* | 11/2013 | Kayama | ............ | H02J 1/00 |
| | | | | 307/26 |
| 2015/0035476 A1* | 2/2015 | Frid | ................. | H02J 7/0021 |
| | | | | 320/107 |
| 2015/0035477 A1* | 2/2015 | Wong | ............... | H02J 7/0068 |
| | | | | 320/107 |

* cited by examiner

UNIFIED HIGH POWER AND LOW POWER BATTERY CHARGER

CROSS-REFERENCE TO RELATED APPLICATION

The present application claims the benefit of U.S. Provisional Application No. 61/923,532, entitled "UNIFIED HIGH POWER AND LOW POWER BATTERY CHARGER" filed Jan. 3, 2014, the content of which is incorporated herein by reference in its entirety for all purposes.

FIELD

The described embodiments relate generally to systems, methods, and apparatus for charging a battery. Specifically, the embodiments relate to an adaptive battery charging scheme that allows the battery to be charged from different power chargers having distinct power outputs.

BACKGROUND

Mobile computing devices, although often convenient for their portability and functionality, often have issues of power consumption and charging speed. Many mobile computing devices consume power very quickly and can occasionally leave a user without a quick means of charging the battery once the battery is depleted. In cases where a user is traveling with multiple different mobile computing devices, a user will have to transport multiple power supplies in order to accommodate the charging specifications of each of device. Unfortunately, typical power supplies such as laptop power supplies are not designed to provide the low power required to charge many smaller devices such as cell phones and media players.

SUMMARY

The embodiments discussed herein relate to systems, methods, and apparatus for providing an adaptive charging circuit capable of handling a range of power inputs. In some embodiments, a machine-readable non-transitory storage medium is set forth. The storage medium can store instructions that, when executed by a processor of a computing device, cause the computing device to carry out steps that include exclusively activating, based on an input provided by a power supply, one of a first switch group and a second switch group included in a charger. The second switch group can be configured to have a greater power capacity than the first switch group. Additionally the steps can include periodically toggling, based on the activating, one or more switches of either the first switch group or the second switch group due to a voltage output from the charger.

In other embodiments, an adaptive charging circuit is set forth. The adaptive charging circuit can include a control logic electrically coupled to a plurality of control switches. The control logic can be configured to selectively activate one or more control switches of the plurality of control switches based on an input value provided to the control logic. The control logic can further be configured to adaptively scale a total number of active control switches relative to an increase or decrease in the input value. Additionally, the control logic can be configured to periodically toggle one or more active control switches for transmitting a voltage output from the adaptive charging circuit.

In yet other embodiments, a system is set forth. The system can include a control logic, and a plurality of control switches each electrically coupled in parallel with each other and electrically coupled to: the control logic, a voltage input connection, and a voltage output connection. Additionally, the control logic can include a memory storing instructions that when executed by the control logic cause the control logic to perform the steps of transmitting one or more control signals for toggling one or more of the control switches of the plurality of control switches. The transmitting of control signals can be based on comparing an input current to an input current threshold accessible to the control logic. Furthermore, the steps can include causing an output voltage to be provided from the system according to the input current.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
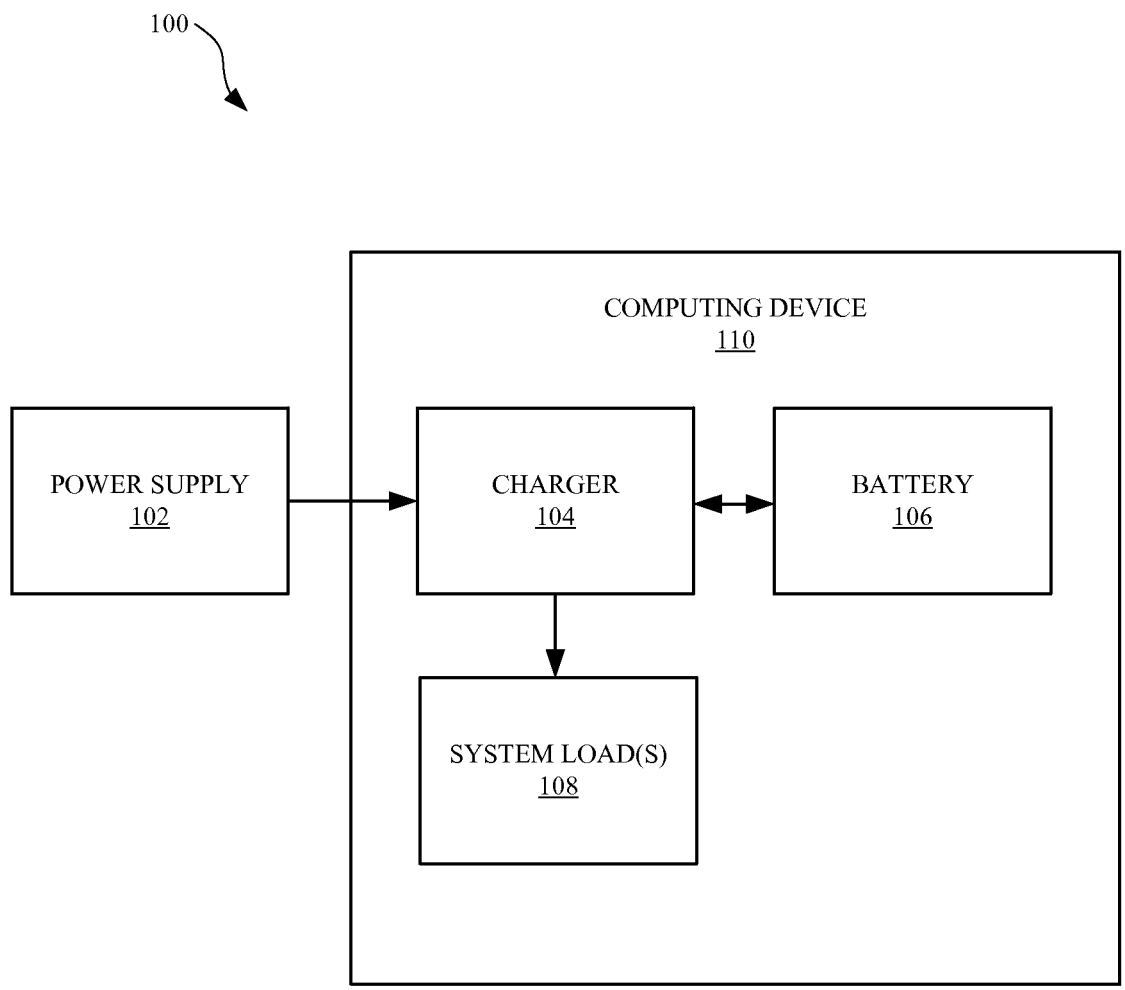
FIG. 1 illustrates a system diagram of a computing device according to some embodiments discussed herein.

Reference will now be made in detail to representative embodiments illustrated in the accompanying drawings. It should be understood that the following descriptions are not intended to limit the embodiments to one preferred embodiment. To the contrary, it is intended to cover alternatives, modifications, combinations, and equivalents as can be included within the spirit and scope of the described embodiments as defined by the appended claims.

The following disclosure relates to systems, methods, and apparatus for charging a battery using a charger capable of switching between multiple different power modes. The power mode that the charger operates in is determined by the input current and/or voltage provided by a power supply. Different power supplies can be individually connected to the charger to charge the battery and provide different power inputs to the charger depending on the power specification of the respective power supply. Accordingly, the chargers described herein may be configured to receive power inputs in a plurality of ranges from different power sources. For example, the charger may receive a first power input level range (referred to as high power) that is higher than a lower range of power input levels (referred to as low power). In some instances, the charger may receive a third power input level range (referred to as medium power) between the high power and low power ranges.

To accommodate the different power input ranges that may be provided to the charger, the charger may be configured to operate in a different mode for each of the plurality of power input ranges. For example, the different power modes of the charger discussed herein can include a high power mode for handling high power supplies and a low power mode for handling low power supplies. The modes refer to the transitioning of certain transistors or groups of transistors in the charger from an active or inactive state for a particular mode. The transistors enable the charger to reduce or otherwise modify an input voltage provided by a power supply by frequently toggling (i.e., switching on or off) the transistors. In some embodiments of the charger, the charger can include a first transistor group and a second transistor group. Each transistor group can include one or more transistors that are either the same or different in some embodiments, and can be arranged in parallel, series, or any other suitable arrangement. For example, in some embodiments, the first transistor group can include the same size transistors as the second transistor group. Furthermore, in other embodiments, the first transistor group can include fewer transistors than the second transistor group. In yet other embodiments, the second transistor group can include larger transistors than the first transistor group, allowing the second transistor group to transfer higher currents than the first transistor group. Each of the first transistor group and the second transistor group can be modified in any suitable way in order to effectively reduce energy consumption of the charger depending on the power supply connected to the charger.

In order to perform the switching between the first transistor group and the second transistor group, a logic circuit can be provided in the charger. The logic circuit, also referred to as a control logic herein, can receive the input current supplied from the power supply and selectively activate and/or deactivate the first transistor group and/or second transistor group according to the input current. Each of the first transistor group and the second transistor group can be configured to reduce or otherwise modify an input voltage or current based on the charging and discharging of the control switches in one or more of the groups. A higher range of input current can be referred to as high current and a lower range of input current can be referred to as low current. When a low input current is provided to the charger, the control logic can activate the first transistor group exclusively, thereby causing the charger to operate in the low power mode. During the low power mode, the first transistor group can be periodically toggled by the control logic in order to allow an input voltage from the power supply to be transmitted by the charger via the first transistor group. In this way, less charge is consumed by the charger because the transistors of the second transistor group are not being charged.

When a high input current is provided to the charger, the control logic can activate the second transistor group exclusively, thereby causing the charger to operate in the higher power mode. During the high power mode, the second transistor group can be periodically toggled in order to allow the input voltage from the power supply to be transmitted by the charger via the second transistor group. In this way, the charger can make more efficient use of the second transistor group, which can be configured to have a higher total capacitance than the first transistor group. In some embodiments, both the first transistor group and second transistor group can be concurrently activated or deactivated. Additionally, in other embodiments more than two transistor groups can be included in the charger for providing even more power modes and allowing the charger to operate using a larger variety of power supplies. For example, in some embodiments, the charger can include at least three transistor groups, wherein a first transistor group can be activated exclusively, or in combination with a second transistor group and/or a third transistor group.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 illustrates a system diagram 100 of a charger 104 of a computing device 110 according to some embodiments discussed herein. The charger 104 can be configured to handle different input powers (e.g., both high power and lower power inputs) from power supplies (such as a power supply 102 shown in FIG. 1) to charge a battery 106 and/or supply power to one or more system loads 108. When handling an input current from power supply 102, the charger 104 can determine the magnitude of the input current and adaptively modify an arrangement of control switches (e.g., transistors) within the charger 104 according to the magnitude of the input current. Each control switch can be associated with a capacitance that can be charged in order to toggle the control switch. Therefore, when multiple control switches are used during a charging operation, a total capacitance will be associated with the multiple control switches, causing the control switches to consume power during a switching operation. In order to reduce the total capacitance, the control switches are selectively set to be active or inactive for a given input current or range of input currents. In this way, the power consumption of the computing device 110 can be reduced, which not only creates a more power efficient computing device 110 but also reduces a thermal output associated with the power consumption. Additionally, by selectively setting more control switches to be active, the charger 104 can make a more efficient use of the input current from the power supply 102. For example, when a high input current is provided, the charger 104 can enter a high power mode where a majority of the control switches are active. In this way, a higher capacitance is made available by the active control switches allowing for a higher amount of charge to be provided to the battery 106, thereby reducing charge time for the battery 106.

The charger 104 can be configured to receive input current from multiple different power supplies having different power output specifications respectively. Additionally, the charger 104 can be configured to handle a range of voltages and input currents. For example, in some embodiments the charger 104 is capable of receiving input current from a universal serial bus (USB) connection, or any other suitable connection for providing power to the computing device 110. Moreover, although the charger 104 is illustrated as being internal to the computing device 110 of FIG. 1, it should be noted that the charger 104 can be configured external to the computing device 110. For example, in some embodiments, the charger 104 can be a separate device from both the power supply 102 and the computing device 110. The computing device 110 can be any suitable computing device capable of receiving current from an external power supply. For example, the computing device 110 can be a cellular phone, tablet computer, media player, desktop computer, laptop computer, or any other consumer electronics device. Additionally, the activity of the control switches in the charger 104 can be powered by the battery 106 or the power supply 102.

Figure 2:
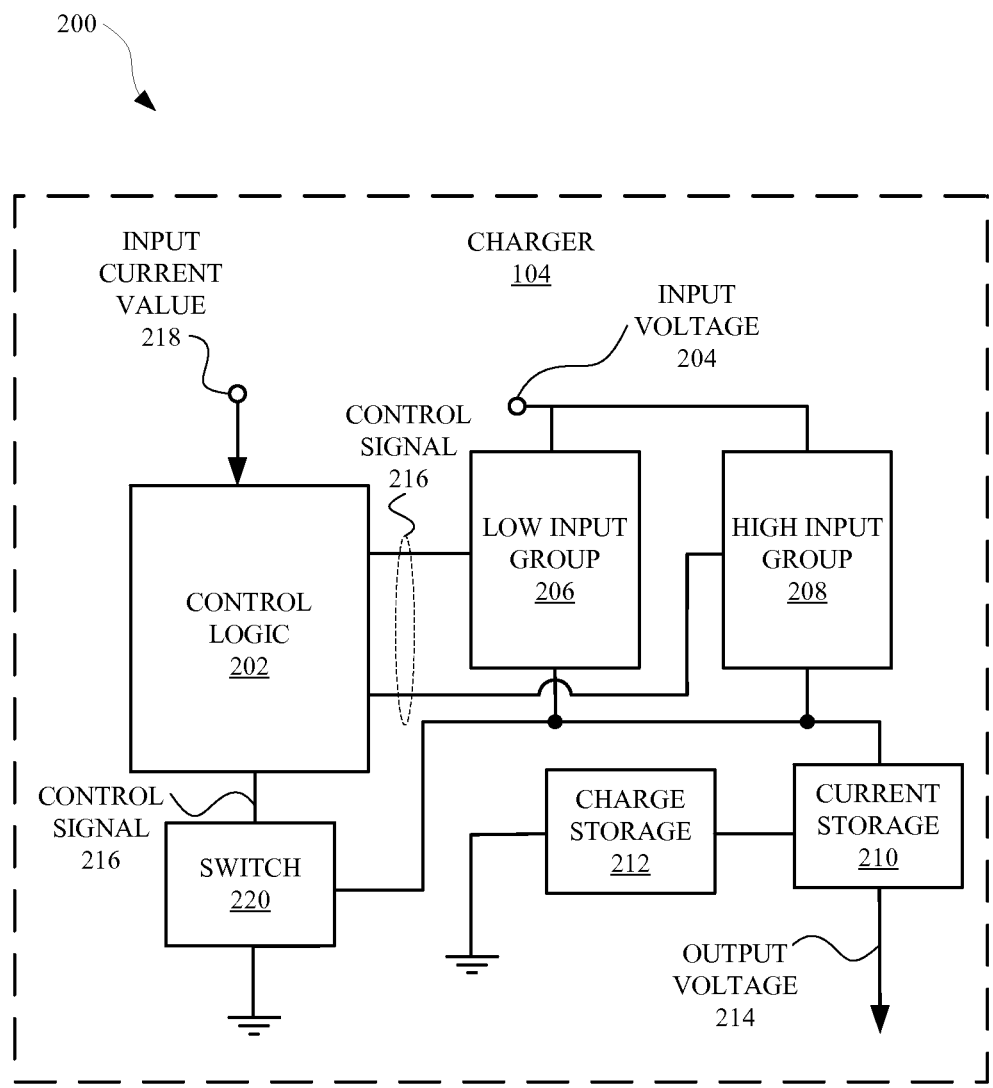
FIG. 2 illustrates a system diagram of a charger according to some embodiments discussed herein.

FIG. 2 illustrates a system diagram 200 of the charger 104 according to some embodiments discussed herein. Specifically, FIG. 2 illustrates an embodiment of the charger 104 having two control switch groups. The two control switch groups are a low input group 206 and a high input group 208. Each of the low input group 206 and the high input group 208 can include one or more control switches (e.g., transistors) that can be activated or deactivated according to a setting of a control logic 202. The control logic 202 can be an apparatus inside the charger 104 that is configured to provide control signals 216 based on an input current value 218. The control logic 202 can be a programmable device that stores software or a non-programmable circuit enabling the control logic 202 to effectively control and individually drive the activity of each of the control switches within the low input group 206 and the high input group 208. In some embodiments, the number of controls switches that are active at a given time can be based on a linear or non-linear correlation between the input voltage or input current and the number of active control switches. For example, as the input voltage or input current increases, the total number of active control switches can increase proportional to the input voltage or input current. In other embodiments, the charger 104 can include one or more comparators that enable the charger 104 to determine the input voltage and/or input current to the charger 104. For example, the input voltage and/or input current can be characterized based on whether the voltage or current input from the power supply 102 is above or below one or more thresholds corresponding to the comparators. In this way, if the input voltage or input current is equal to or above a threshold defined by a comparator, the charger 104 can enter a high power mode (i.e., exclusively activate the high input group 208) as discussed herein. Additionally, if the input voltage or input current is below the threshold defined by the comparator, the charger 104 can enter a low power mode (i.e., exclusively activate the low input group 206) as discussed herein.

Additionally, in some embodiments, the control logic 202 can store or access a table that associates an input current or voltage with a value in the table corresponding to a switching scheme to be used. Therefore, the charger 104 can activate or deactivate certain control switches according to the values in the table corresponding to the control switches. In some embodiments, multiple tables are stored by or accessible to the control logic 202, and each of the multiple tables can correspond to a voltage, current, or power input, or any combination thereof. The multiple tables can include a high voltage table and a low voltage table, and each table can include one or more current values. The current values can correspond to switching schemes, therefore when a particular current is received the switching scheme corresponding to the particular current can be followed. For example, if the input voltage is less than 5 volts then the low voltage table can be referenced by the charger 104. If the current is 100 milliamps and the table includes a switching scheme corresponding to 100 milliamps (e.g., activating a single control switch) then that switching scheme can be followed. The multiple tables can be updated by a user or manufacturer of the charger 104, control logic 202, or computing device 110 through a software update in order to accommodate new and different power supplies.

The input current value 218 can be the input current from the power supply 102 or a signal corresponding to the input current from the power supply 102. In this way, the control logic 202 can receive a signal from which to determine how much current is being provided by the power supply 102 and activate or deactivate the low input group 206 and/or the high input group 208 accordingly. For example, the control logic 202 can be configured to activate the low input group 206 when the input current 218 is below a current threshold (i.e., when the current is low) and deactivate the high input group 208. Thereafter, the control logic 202 can provide the control signal 216 to the low input group 206 and switch 220 for periodically or non-periodically closing one or more control switches in the low input group 206 and switch 220. By closing one or more of the control switches, a current will be able to move through a current storage 210 and a charge storage 212, and ultimately be output as an output voltage 214. In some embodiments the current storage 210 and/or the charge storage 212 are optional features. Furthermore, in some embodiments, a switch 220 is provided in order to close a portion of the circuit of the charger 104 according to the control signal 216. The switch 220 can be closed or opened concurrently with or subsequent to the closing or opening of one or more of the control switches in the low input group 206 and/or the high input group 208. When the switch 220 is closed and the low input group 206 and/or high input group 208 are open, the charge storage 212 can discharge thereby supplementing the output voltage 214. The current storage 210 and the charge storage 212 can act to flatten the output voltage 214. In some embodiments, the current storage 210 can include one or more inductors and the charge storage 212 can include one or more capacitors. The output voltage 214 can be provided to the battery 106 for charging the battery 106 and/or one or more system loads 108 for operating other components and loads (e.g., a central processing unit (CPU) and graphics processing unit (GPU)) of the computing device 110.

Figure 3:
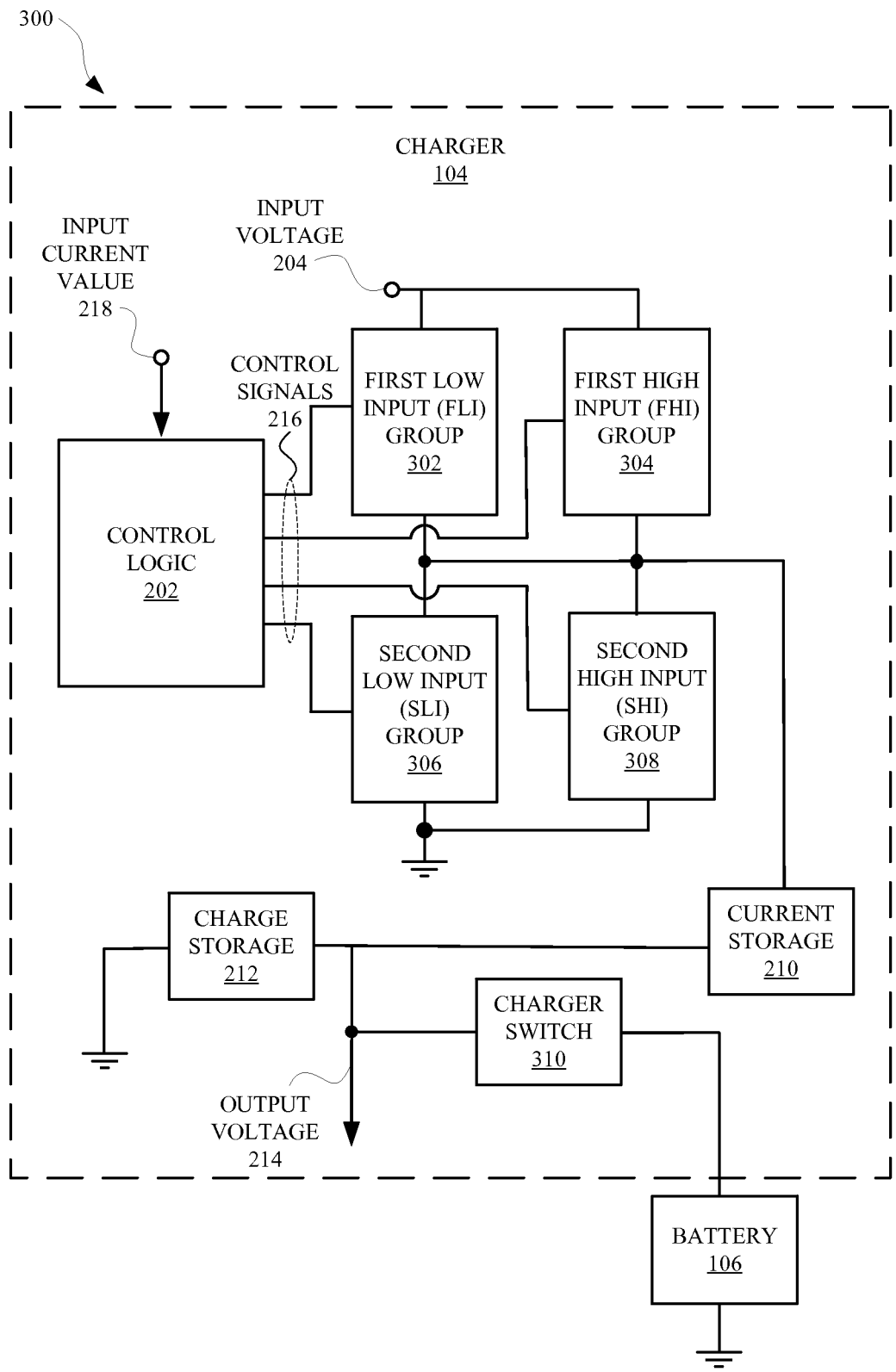
FIG. 3 illustrates a system diagram of the charger according to some embodiments.

FIG. 3 illustrates a system diagram 300 of the charger 104 according to some embodiments. Specifically, FIG. 3 illustrates an embodiment of the charger 104 having a first group of control switches connected to an input voltage 204 and a second group of control switches connected to a ground connection. The first group of control switches can include a first low input (FLI) group 302 and a first high input (FHI) group 304. The second group of control switches can include a second low input (SLI) group 306 and a second high input (SHI) group 308. The control switches within each of the aforementioned groups can be the same or different with respect to size and/or capacitance. Additionally, each of the respective groups can include the same total number of control switches or a different total number of control switches respectively. For example, the FLI group 302 can include the same number of control switches as the SLI group 306 and a different number of control switches than the FHI group 304. Moreover, the FLI group 302 and the SLI group 306 can include control switches that are the same size but are of a smaller size than one or more of the control switches included in the FHI group 304. It should be noted that any suitable combination of size and quantity of control switches for each group is within the scope of this disclosure.

The control logic 202 of FIG. 3 can selectively activate and/or deactivate one or more of the FLI group 302, the FHI group 304, the SLI group 306, and the SHI group 308 based on the input current value 218. For example, when the input current value 218 corresponds to a high power input, the control logic 202 can enter a high power mode. The high power mode can correspond to an arrangement where the FLI group 302 and the SLI group 306 are deactivated and the FHI group 304 and the SHI group 308 are activated. While activated, the control switches of the FHI group 304 and the SHI group 308 can be opened and/or closed concurrently, serially, or sequentially. Additionally, the opening and closing of a respective control switch can be performed periodically. The charger 104 can operate according to an operating period or duty cycle, which can include both a closed-switch interval where a control switch is closed, and an open-switch interval where a control switch is open. Therefore, during an operating period of the high power mode, the control switches of the FHI group 304 can be closed for an interval of time and the control switches of the SHI group 308 can be closed for an interval of time. In some embodiments, the FHI group 304 can be closed for an interval of time within the operating period that is shorter than an interval of time that the SHI group 308 is closed, and vice versa. This also applies to the low power mode where the FLI group 302 can be closed for an interval of time that is shorter than an interval of time that the SLI group 306 is closed, and vice versa.

Upon closing of the FLI group 302 or the FHI group 304, the input voltage 204 can be received by the current storage 210 and the charge storage 212 for flattening the input voltage 204, in order to provide a smoother output voltage 214. Additionally, the charger 104 can be electrically coupled to a charging switch 310 and the battery 106. The charging switch 310 can be operated by the control logic 202 or any other suitable apparatus in order to compensate for any decreases in the output voltage 214. Decreases in the output voltage 214 can result from a time delay that can occur between the opening and closing of the various control switches. The time delay can cause unacceptable voltage spikes and other analog issues if the time delay is too long. However, by supplementing the output voltage 214 with the battery 106, these concerns can be mitigated because the battery 106 can act as a reservoir to correct a deficit in current during the time it takes to open and close on one or more of the control switches.

Figure 4:
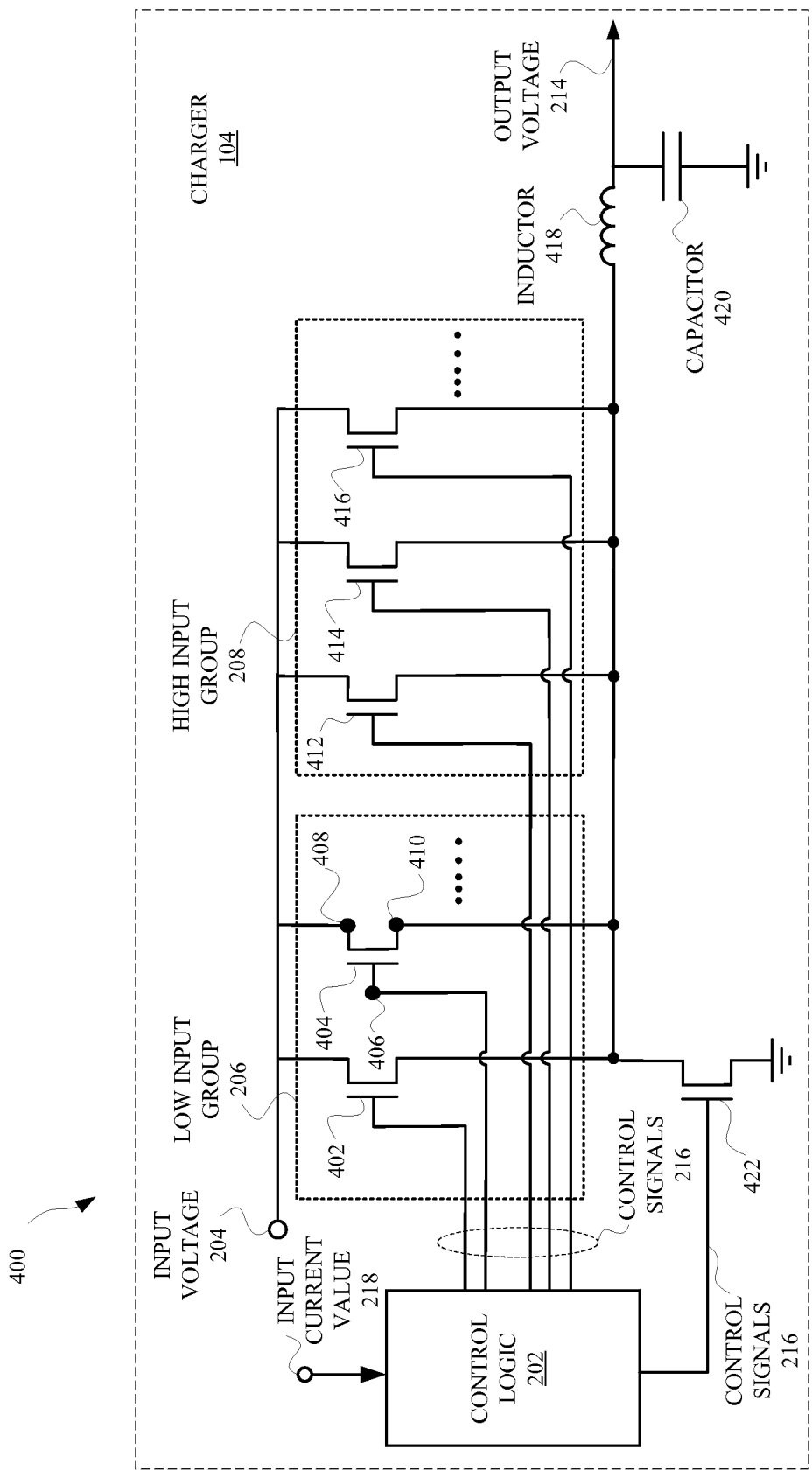
FIG. 4 illustrates a circuit diagram of the charger according to some embodiments.

FIG. 4 illustrates a circuit diagram 400 of the charger 104 according to some embodiments. Specifically, FIG. 4 sets forth the circuit components that can be included in the charger 104 to allow the charger 104 to handle a variety of input currents from the power supply 102. For example, the low input group 206 can include one or more transistors. The transistors 402, 404, 412, 414, and 416 can be connected in parallel and can each include a gate 406 connected to the control logic 202. In this way, the control logic 202 can output one or more control signals 216 that can provide a current to the gate 406 in order to create a conductive pathway between a source 410 and a drain 408 of each of the transistors 402, 404, 412, 414, and 416 (e.g., transistors 402 and 404 when in the low power mode). When the gate 406 of the transistor 404 is receiving a control signal 416, the transistor 404 is closed, and when the gate 406 of the transistor 404 is not receiving a control signal 416 the transistor 404 is open. If the charger 104 is in a high power mode, the transistors 402 and 404 will be prevented from receiving a control signal 216 and therefore they will be deactivated. However, during the high power mode the transistors 412, 414, and 416 will be allowed to receive a control signal 216 and will therefore be active. Moreover, if the gates 406 of each of the transistors 412, 414, and 416 receive a control signal 216 they will be considered closed, otherwise they will be considered open.

The transistors 412, 414, and 416 can be closed temporarily according to a periodic pulse input defined by the control signals 216. As a result, a current will transmit through the transistors 412, 414, and 416 from the input voltage 204 concurrently with or subsequent to the release of the control signals 216 to the transistors 412, 414, and 416. Thereafter, the current will pass through the inductor 418, a capacitor 420 will receive charge, and an output voltage 214 will be provided to any suitable components electrically coupled to the charger 104 such as the battery 106 and/or system loads 108. It should be noted that the term electrically coupled is used herein to refer to a connection between two components that is direct or indirect, and can include one or more other components in between the two components. During the high power mode, a transistor 422 can be closed subsequent to or concurrently with the opening of the transistors 412, 414, and 416. The transistor 422 can be toggled according to a control signal 216 from the control logic 202 in order to allow a discharging of the capacitor 420 when the low input group 206 and/or high input group 208 are open. The opening and closing of the various transistors can be performed periodically during the low power mode as well, wherein the low input group 206 will be opened and closed instead of the high input group 208.

In some embodiments, the charger 104 can include one or more transistors that are shared between two or more transistor groups. For example, transistor 412 can be shared between the high input group 208 and the low input group 206. In this way, transistor 412 will be activated when one or both of the high input group 208 and the low input group 206 are activated. Additionally, in some embodiments, transistors 412 and 404 can be shared between the high input group 208 and the low input group 206. In this way, transistors 412 and 404 will be activated when one or more both of the high input group 208 and the low input group 206 are activated. It should be noted that any suitable number of transistors can be shared by any suitable number of transistor groups in order to limit the power consumption of the charger 104.

In some embodiments, the charger 104 can be provided multiple input signals corresponding to multiple voltages, currents, or powers. This can be useful in multi-channel or multi-phase scenarios when the charger 104 needs to output multiple voltage signals. In such embodiments, the charger 104 can include multiple control logics 202 or a single extended control logic 202. By expanding the control logic 202, additional control signals 216 can be provided to any additional transistors necessary for handling the multiple input signals. Moreover, each of the input signals can be assigned one or more dedicated control switch groups, and the total number of control switches activated at a given time can be the same or different per input signal. For example, in a three phase scenario, a first channel, second channel, and third channel can each provide an input voltage to the charger 104. Thereafter, each channel can rely on one or more control switch groups to efficiently output a voltage signal from three separate output voltage connections of the charger 104. The control switch groups corresponding to each channel can be activated or deactivated by the control logic(s) 202 based on their respective inputs, according to the embodiments discussed herein.

In some embodiments, the control logic 202 of the charger 104 can be a power management integrated circuit (PMIC) or a power management unit (PMU) of the computing device 110. Additionally, the power supply 102 that provides power to the charger 104 can be considered a high power supply when the power supply 102 provides at least 10 watts of power. The high power can correspond to a voltage of at least 10 volts and a current of at least 1 ampere in some embodiments. The power supply 102 can be considered a low power supply when the power supply 102 provides power of less than 10 watts. The low power can correspond to a voltage of about 4 or 5 volts and a current of approximately 1 or 2 amperes. When the power supply 102 is a universal serial bus (USB) power supply, the power from the power supply 102 can be approximately 2 watts at a voltage between 4 and 5 volts, and a current of less than 1 ampere.

In some embodiments, the transistors included in the charger 104 can be p-channel metal oxide semiconductor field effect transistors (MOSFET) or PMOS. In other embodiments, the transistors can be NMOS transistors (i.e., n-channel MOSFETs). Furthermore, the transistors included in the charger 104 can be physically scaled to handle higher voltages, higher currents, and higher power. At higher power, operating the transistors will consume more power, thus more transistors can be incorporated and activated to handle the higher power. At low power, these transistors can be scaled down to consume less power and make more efficient use of the power being supplied to the charger 104.

In some embodiments, the input voltage (i.e., low or high voltage) and input current from the power supply 102 can be known to the charger 104, and thus the total number of transistors activated can be scaled according to the input voltage and input current. In other embodiments, input voltage, input current, and input power from the power supply 102 may not be known. In such a case, the number of transistors activated cannot be scaled based on known parameters. Therefore, in some embodiments one transistor or a fraction of the total number of transistors can be initially activated. Thereafter, the number of activated transistors can be increased by the control logic 202 in order to scale with the input voltage and input current from the power supply 102. In some embodiments, the input current or input voltage to the charger 104 can be detected using a current detector or voltage detector. Additionally, a table can be used to determine the number of transistors that should be activated for optimal efficiency, as further discussed herein. In other embodiments, a software program can be used to determine the number of transistor that should be activated for optimal efficiency according to the input. Furthermore, the charger 104 can directly communicate with the power supply providing the input power in order to fix the input voltage/current or enforce a threshold voltage/current on the power supply. As an example, this communication can be achieved using a digital signal, such as Universal Asynchronous Receiver/Transmitter (UART), or any other suitable communication protocol between a power supply and a device. In this way, the charger 104 can communicate the input voltage and/or input current for the power supply 102 to provide, and thus the charger 104 would already know what voltage/current value to use as a basis for the transistor scaling (i.e., activating and deactivating of a fraction or ratio of total transistors).

In some embodiments, the control logic 202 can be configured to receive a temperature input value. The temperature input value can correspond to a temperature of the control logic 202, or any other component or apparatus included in the computing device 110. The control logic 202 can thereafter use the temperature input value as a basis for activating and deactivating the one or more control switches. In this way, if the temperature of the charger 104 is increasing or is above a predetermined temperature threshold, additional control switches can be activated in order to diffuse or disseminate the consumption of power at the charger 104 among more control switches. By disseminating the consumption of power, the temperature of the charger 104 can be reduced.

The control switches discussed herein can each be opened and closed by the control logic 202 according to a frequency ($f_{sw}$), which can be in the megahertz range in some embodiments. In other embodiments, the frequency can be less than or greater than the megahertz range. The bias current associated with commutating the control switches is $I_Q$. The bias current, $I_Q$ can be dependent on the total charge ($Q_{G\text{-}total}$) of capacitances corresponding to control switches, and the switching frequency ($f_{sw}$) of the control switches. The capacitances can be located between the gate and source ($C_{GS}$), gate and drain ($C_{GD}$), and drain and source ($C_{DS}$). In this way, the relationship between the bias current $I_Q$, the respective capacitances, and the voltage between the gate and source, VGS, can be described by the following equations:

$$I_Q = f_{sw} \times Q_{G\text{-}total} \tag{1}$$

$$Q_{G\text{-}total} = C_{GS} \times V_{GS} \text{(for the case where } C_{GS} \text{ is much greater than} (C_{GD} + C_{DS})) \tag{2}$$

Regardless of whether there is a low or high power input from the power supply 102, the charger 104 must switch all the active transistors at the switching frequency ($f_{sw}$), which corresponds to the period or duty cycle discussed herein. Therefore, in order to reduce the bias current $I_Q$ that the charger 104 needs to operate, one or more of the transistors can be deactivated according to the embodiments discussed herein. In some embodiments, one or more drain extended devices can also be used to further reduce the bias current $I_Q$ because drain extended devices have a higher $C_{GS}$ to ($C_{GD} + C_{DS}$) ratio than some other MOSFETS.

As discussed herein, each group of control switches can correspond to a variety of control switches. Moreover, each group (e.g., the low input group 206 and high input group 208) can be activated or deactivated according to the same input current value, such as 12 mA. In other embodiments, each group can be activated or deactivated according to a different current value, such as 12 mA for the low input group 206 and 60 mA for the high input group 208. In this way, each group can correspond to a particular current, voltage, or power input in order for the charger 104 to select a group to activate according to the particular current, voltage, or power input, or range of such inputs. It should be noted that more or less transistors can be provided in each group of any of the embodiments discussed herein (as indicated by the dots adjacent to the transistors of low input group 206 and high input group 208 in FIG. 4). Moreover, any number of control switch groups can be provided in order to accommodate the power input provided by one or more power supplies that can be electrically coupled to the charger 104. For example, a medium input group can be electrically coupled to the control logic 202 and include one or more control switches. The medium input group can be activated by the control logic 202 when a power supply supplies a current, voltage, and/or power to the charger 104 that is between the respective currents, voltages, and/or powers that activate the low input group 206 and high input group 208 respectively. Moreover, the medium input group can contain the same or a different number and/or size of control switches as the high input group 208 and/or low input group 206.

By scaling a number of active transistors in the charger 104, a variety of benefits can be realized. Specifically, without transistor scaling the idle current consumption of a charger and a device can be very high. For example, if the input power was 5V at 100 milliamperes (mA) (500 milliwatts (mW)), a power loss can be as high as 350 mW. Such a power loss can cause the device to fail Energy Star requirements for energy efficiency. Moreover, the power loss can result in a high thermal output, leaving little power available for charging the device (i.e., only 150 mW is available for charging, 150 mW=500 mW−350 mW). Therefore, using fewer transistors for charging can result in the passage of Energy Star requirements, lower thermal loss, and more power available for charging. Moreover, using fewer transistors for charging can cause problems when a high power supply is provided to the charger 104. Therefore, transistor scaling is used to activate more transistors for more efficiently providing an output voltage when a high power supply is electrically coupled to the charger 104. Transistor scaling also has the added advantage of allowing for faster charging and shorter charging time when a high power supply is provided to the charger 104.

Figure 5:
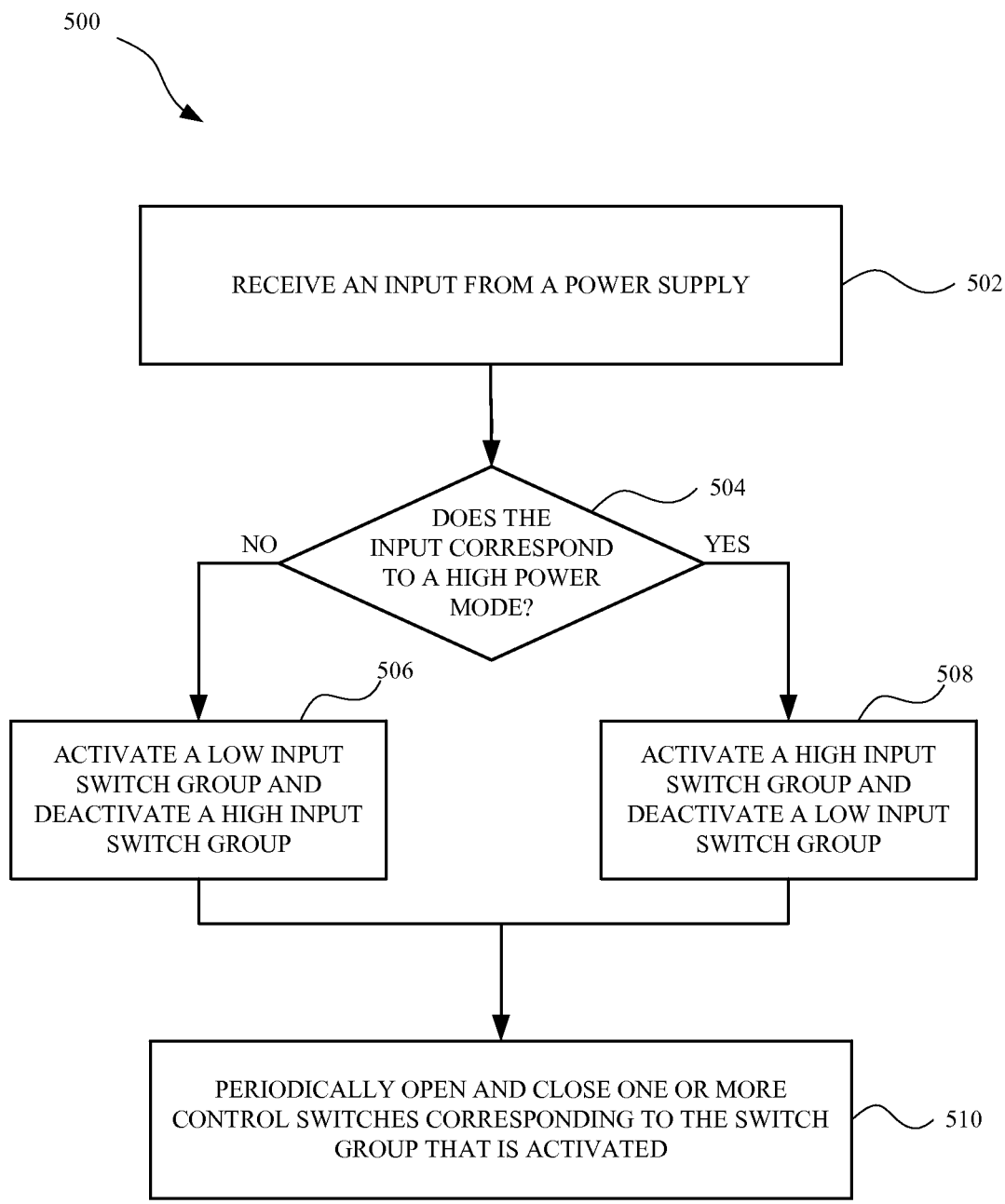
FIG. 5 illustrates a method for activating a switch group based on an input from a power supply.

FIG. 5 illustrates a method 500 for activating a switch group based on an input from a power supply. The method 500 can be performed by any suitable software module or apparatus such as the charger 104 or control logic 202 discussed herein. The method 500 includes a step 502 of receiving an input from a power supply. The input can be a current, voltage, and/or power input value. At step 504, a determination is made at step 504 as to whether the input corresponds to a high power mode. If the input corresponds to a high power mode then, at step 508, a high input switch group is activated and a low input switch group is deactivated. If the input does not correspond to a high power mode then, at step 506, a low input switch group is activated and a high input switch group is deactivated. The low power mode and high power mode can be associated with one or more thresholds or ranges. Therefore, if the input from the power supply is within a certain range, or above or below a threshold, a high or low power mode can be entered. For example, if the input is above or equal to an input threshold, the high power mode can be entered, but if the input is below an input threshold, the low power mode can be entered. Moreover, activated and deactivated can refer to whether a switch within a respective switch group can be toggled between an opened and closed state. In some embodiments, when a switch is active, a driver circuit such as the control logic 202 can provide a control signal to the active switch to toggle the active switch. When the switch is deactivated, the driver circuit will be configured to not provide a control signal to the deactivated switch so that the deactivated switch cannot be toggled. At step 510, one or more of the control switches corresponding to a switch group that was activated can be periodically opened and closed. The opening and closing (i.e., toggling) of the one or more control switches can be performed according to the control logic 202 or any other suitable driver circuit. The period of the toggling can correspond to a frequency within a range of megahertz. By closing a control switch, an input current from the power supply can be transmitted through the control switch. By opening the control switch, the input current from the power supply will be not be transmitted through the control switch. Such action can be beneficial in buck circuits where a switch is frequently toggled in order to provide an output voltage.

Figure 6:
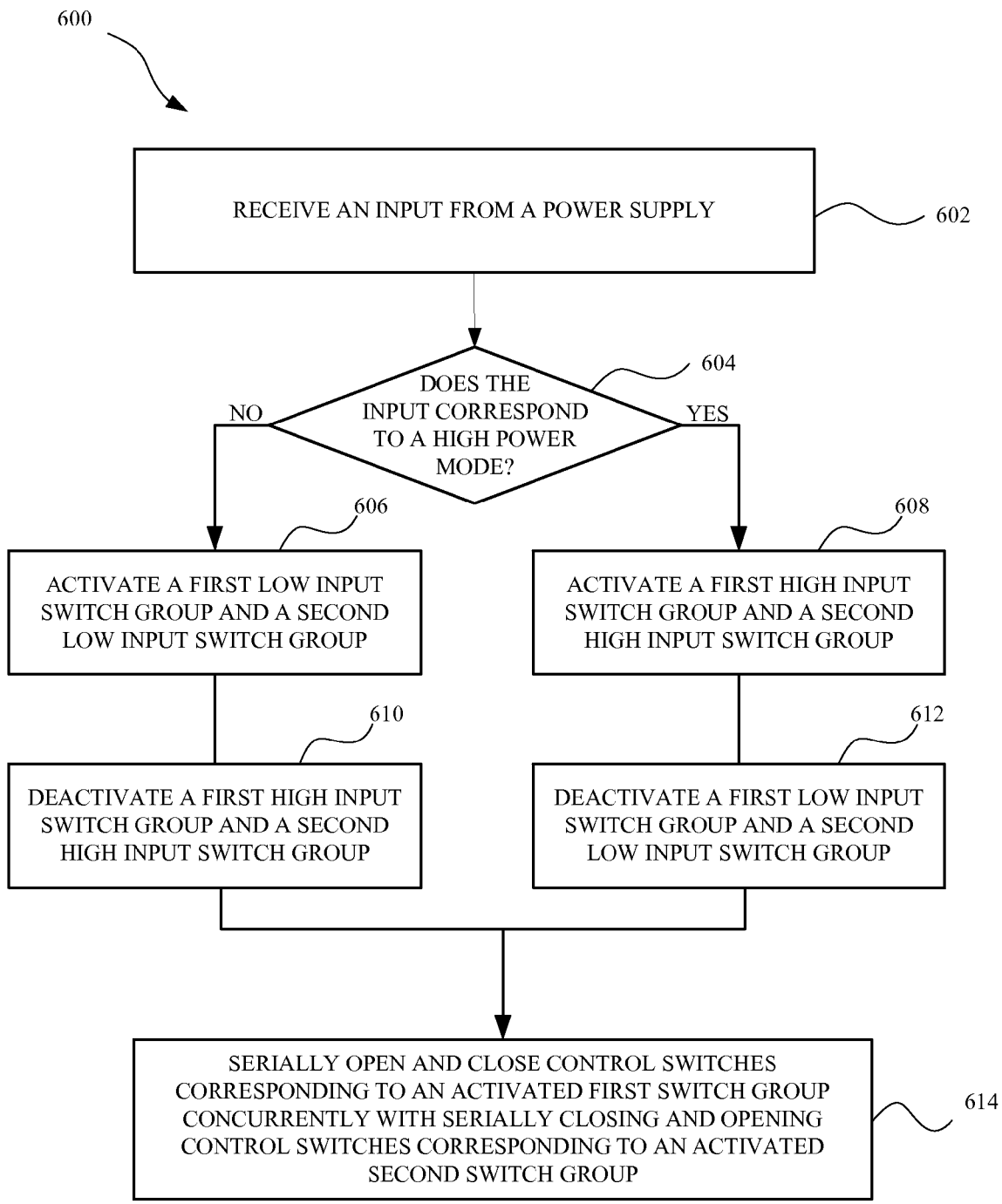
FIG. 6 illustrates a method for activating and deactivating multiple switch groups based on an input from a power supply.

FIG. 6 illustrates a method for activating and deactivating multiple switch groups based on an input from a power supply. The method 600 can be performed by any suitable apparatus or module such as the charger 104 discussed herein. The method 600 includes a step 602 of receiving an input from a power supply. The input can be a current, voltage, and/or power input value. At step 604, a determination is made at step 604 as to whether the input corresponds to a high power mode. If the input does not correspond to a high power mode then, at step 606, a first low input switch group and a second low input switch group can be activated. Additionally, at step 610, a first high input group and a second high input group can be deactivated. If the input corresponds to a high power mode then, at step 608, the first high input switch group and the second high input switch group can be activated. Furthermore, at step 612, the first low input group and the second low input group can be deactivated. Thereafter, at step 614, control switches corresponding to an activated first switch group (e.g., high or low) can be activated subsequent to the opening and closing of control switches corresponding to an activated second switch group (e.g., high or low). Step 612 describes alternating the opening and closing of control switches in different switch groups such that the control switches of one switch group are closed when the control switches of another switch group are open. In this way, an input voltage provided by the power supply can be pulsed according to the toggling of a first active switch group. When the control switches providing the input voltage are open, a second active switch group can be closed in order to discharge a capacitor electrically coupled to the second group. In this way, the output voltage of the charger can be a combination of a pulsed input voltage and a discharge current from the capacitor.

Figure 7:
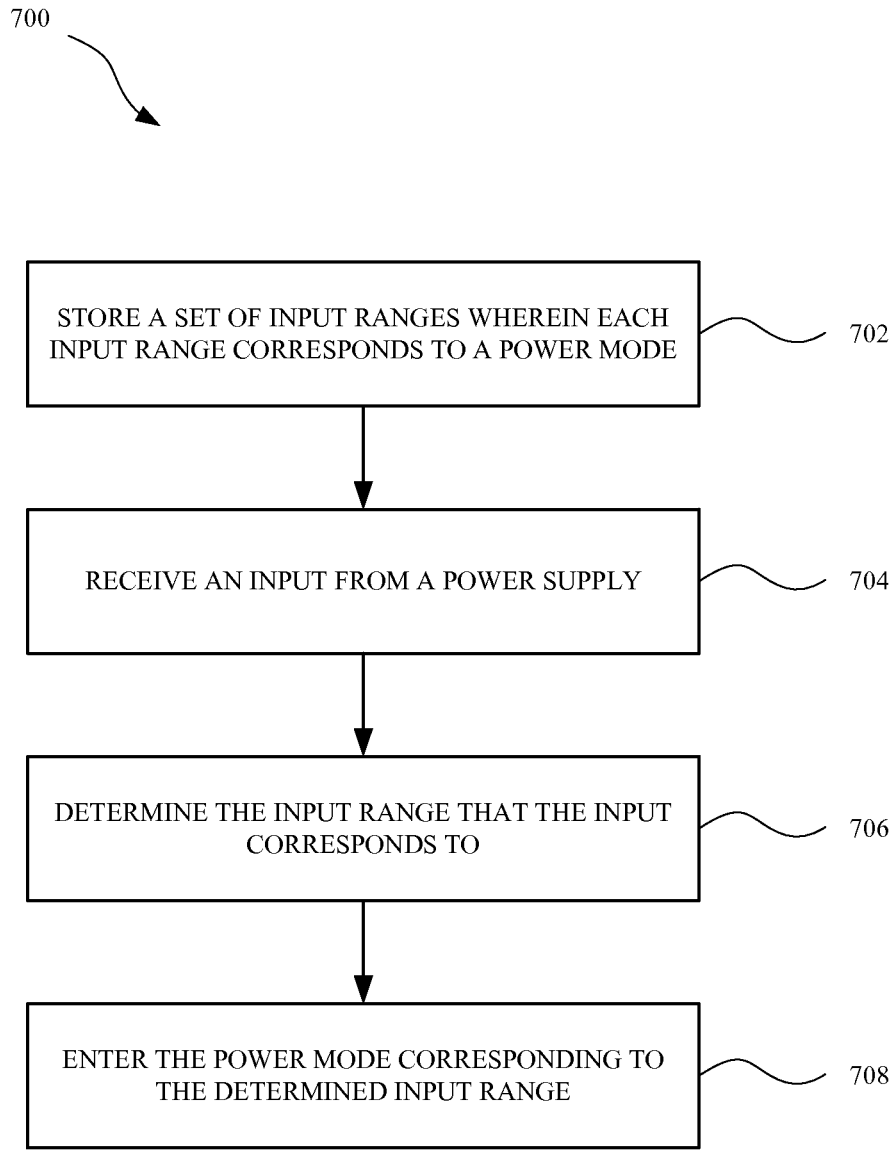
FIG. 7 illustrates a method for entering a power mode according to an input received from a power supply.

FIG. 7 illustrates a method 700 for entering a power mode according to an input received from a power supply. The method 700 can be performed by any suitable apparatus or module such as the charger 104 discussed herein. The method 700 can include a step 702 of storing a set of input ranges wherein each input range corresponds to a power mode. At step 704, an input is received from a power supply. The input can be a current, voltage, and/or power input value. At step 706, a determination is made as to which input range the input corresponds to. Thereafter, at step 708, a power mode corresponding to the determined input range is entered. By entering the power mode, one or more control switches corresponding to the power mode can be activated and toggled in order to efficiently provide an output voltage from the charger 104 without activating or toggling unnecessary control switches. By reducing or increasing the number of control switches that are activated, less power is wasted by the charger 104.

Figure 8:
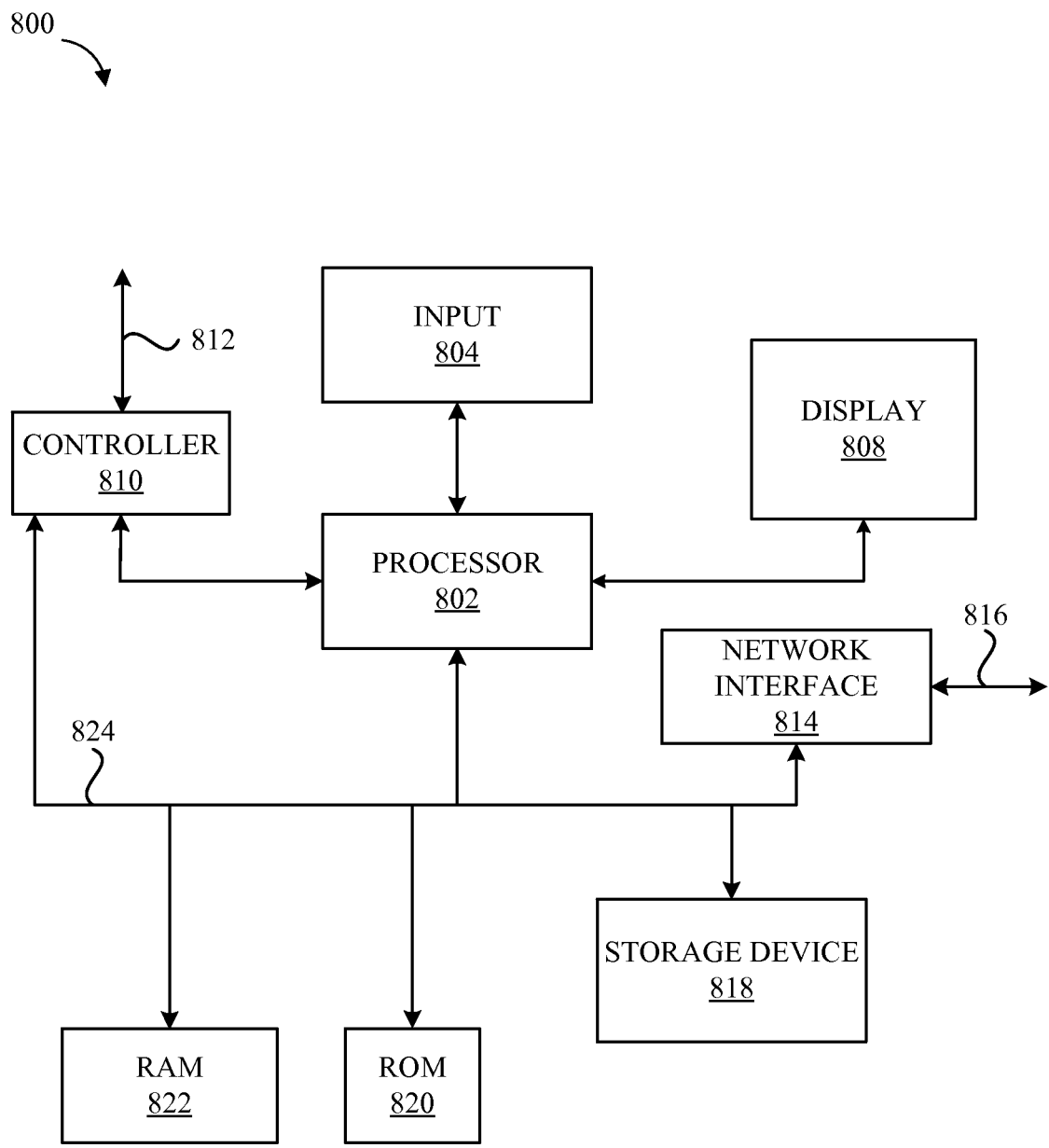
FIG. 8 is a block diagram of a computing device according to some embodiments discussed herein.

FIG. 8 is a block diagram of a computing device 800 that can represent the components of the charger 104, computing device 110, or any other suitable device capable of performing the embodiments discussed herein. It will be appreciated that the components, devices or elements illustrated in and described with respect to FIG. 8 may not be mandatory and thus some may be omitted in certain embodiments. The computing device 800 can include a processor 802 that represents a microprocessor, a coprocessor, circuitry and/or a controller for controlling the overall operation of computing device 800. Although illustrated as a single processor, it can be appreciated that the processor 802 can include a plurality of processors. The plurality of processors can be in operative communication with each other and can be collectively configured to perform one or more functionalities of the computing device 800 as described herein. In some embodiments, the processor 802 can be configured to execute instructions that can be stored at the computing device 800 and/or that can be otherwise accessible to the processor 802. As such, whether configured by hardware or by a combination of hardware and software, the processor 802 can be capable of performing operations and actions in accordance with embodiments described herein.

The computing device 800 can also include user input device 804 that allows a user of the computing device 800 to interact with the computing device 800. For example, user input device 804 can take a variety of forms, such as a button, keypad, dial, touch screen, audio input interface, visual/image capture input interface, input in the form of sensor data, etc. Still further, the computing device 800 can include a display 808 (screen display) that can be controlled by processor 802 to display information to a user. Controller 810 can be used to interface with and control different equipment through equipment control bus 812. The computing device 800 can also include a network/bus interface 814 that couples to data link 816. Data link 816 can allow the computing device 800 to couple to a host computer or to accessory devices. The data link 816 can be provided over a wired connection or a wireless connection. In the case of a wireless connection, network/bus interface 814 can include a wireless transceiver.

The computing device 800 can also include a storage device 818, which can have a single disk or a plurality of disks (e.g., hard drives) and a storage management module that manages one or more partitions (also referred to herein as "logical volumes") within the storage device 818. In some embodiments, the storage device 818 can include flash memory, semiconductor (solid state) memory or the like. Still further, the computing device 800 can include Read-Only Memory (ROM) 820 and Random Access Memory (RAM) 822. The ROM 820 can store programs, code, instructions, utilities or processes to be executed in a non-volatile manner. The RAM 822 can provide volatile data storage, and store instructions related to components of the storage management module that are configured to carry out the various techniques described herein. The computing device 800 can further include data bus 824. Data bus 824 can facilitate data and signal transfer between at least processor 802, controller 810, network interface 814, storage device 818, ROM 820, and RAM 822.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A machine-readable non-transitory storage medium storing instructions that, when executed by a processor included in a computing device, cause the computing device to carry out steps that include:
    exclusively activating, based on an input provided by a power supply, one of a first switch group and a second switch group included in a charger, wherein the second switch group has a greater capacitance than the first switch group; and
    periodically toggling, based on the activating, one or more switches of either the first switch group or the second switch group causing a voltage output from the charger.

2. The machine-readable non-transitory storage medium as recited in claim 1, wherein the steps further include:
    periodically toggling one or more switches of a third switch group concurrently with either the first switch group or the second switch group, wherein toggling includes opening and closing a switch.

3. The machine-readable non-transitory storage medium as recited in claim 2, wherein the steps further include:
    closing one or more switches of the third switch group during an interval of time when one or more switches of the first switch group or the second switch group are open.

4. The machine-readable non-transitory storage medium as recited in claim 2, wherein the steps further include:
    charging a charge storage when one or more switches of the third switch group are open; and
    discharging the charge storage when one or more switches of the third switch group are closed.

5. The machine-readable non-transitory storage medium as recited in claim 1, wherein the steps further include:
    comparing the input to an input threshold, wherein the first switch group is activated when the input is below the input threshold and the second switch group is activated when the input is equal to or above the input threshold.

6. The machine-readable non-transitory storage medium as recited in claim 1, wherein the first switch group includes a first total number of control switches and the second switch group includes a second total number of control switches that is greater than the first total number of control switches.

7. The machine-readable non-transitory storage medium as recited in claim 1, wherein activating the first switch group includes activating a first control switch of the first switch group, and the first control switch has a smaller capacitance than a second control switch of the second switch group.

8. An adaptive charging circuit, comprising:
    a control logic electrically coupled to a plurality of control switches, wherein the control logic is configured to:
        selectively activate one or more control switches of the plurality of control switches based on an input value provided to the control logic from a power supply;
        adaptively scale a total number of active control switches according to an increase or decrease in the input value; and
        periodically toggle one or more of the active control switches to transmit a voltage output from the adaptive charging circuit.

9. The adaptive charging circuit as recited in claim 8, wherein the plurality of control switches are each electrically coupled in parallel between an input voltage and an inductor, and the inductor is electrically coupled to a charge storage device.

10. The adaptive charging circuit as recited in claim 9, wherein the plurality of control switches correspond to a first switch group and a second switch group, and the control logic is further configured to:
- activate the first switch group when the input value corresponds to a low power supply being connected to the adaptive charging circuit; and
- activate the second switch group when the input value corresponds to a high power supply being connected to the adaptive charging circuit.

11. The adaptive charging circuit as recited in claim 10, wherein a low power supply corresponds to a first power supply that provides an input value that is less than an input threshold, and a high power supply corresponds to a second power supply that provides an input value that is equal to or greater than the input threshold.

12. The adaptive charging circuit as recited in claim 10, wherein the first switch group contains less control switches than the second switch group.

13. The adaptive charging circuit as recited in claim 8, further comprising:
- a discharge switch electrically coupled to: the control logic, the plurality of control switches, and an output voltage connection.

14. The adaptive charging circuit as recited in claim 13, wherein the control logic is further configured to:
- toggle the discharge switch such that the discharge switch is closed at a point in time when a control switch of the plurality of control switches is open.

15. A system, comprising:
- a control logic;
- a plurality of control switches each electrically coupled in parallel with each other and electrically coupled to: the control logic, a voltage input connection, and a voltage output connection; and
- a memory storing instructions that when executed by the control logic cause the control logic to perform the steps of:
  - transmitting, based on comparing an input current to an input current threshold accessible to the control logic, one or more control signals for toggling one or more control switches of the plurality of control switches; and
  - causing an output voltage to be provided from the voltage output connection according to the input current.

16. The system as recited in claim 15, wherein a greater number of control switches are toggled when the input current is equal to or greater than the input current threshold compared to when the input current is less than the input current threshold.

17. The system as recited in claim 15, further comprising a discharge switch, and the steps further include:
- transmitting a discharge switch signal to toggle the discharge switch concurrently with the toggling of the one or more control switches.

18. The system as recited in claim 15, wherein a total number of control switches being toggled increases when the input current increases from below to above the input current threshold.

19. The system as recited in claim 15, wherein the input current is generated by a power supply electrically coupled to the control logic, and the control logic is configured to provide the one or more control signals to the one or more control switches for charging a battery electrically coupled to the system.

20. The system as recited in claim 15, wherein a frequency of toggling the one or more control switches is at least within a range of megahertz.

* * * * *